Dec. 15, 1953  U. P. COLE  2,662,298
FUEL VALVE TIMING GAUGE
Filed June 14, 1952

INVENTOR:
Unus P. Cole,
BY OO Martin,
ATTORNEY.

Patented Dec. 15, 1953

2,662,298

UNITED STATES PATENT OFFICE 2,662,298

FUEL VALVE TIMING GAUGE

Unus P. Cole, Glendale, Calif.

Application June 14, 1952, Serial No. 293,574

1 Claim. (Cl. 33—180)

The fuel injection system of internal combustion engines of certain types includes plungers which are axially movable by cams on a control shaft of the engine to open the fuel injection valves. The adjustment of these plungers correctly to time the opening of the valves is often a serious problem.

It is, in view of the foregoing, the object of the present invention to provide a simple and inexpensive device for correctly gaging the positions of such valve plungers. It is a further object of the invention to provide visible means for indicating the correct setting of the plungers.

Figure 1:
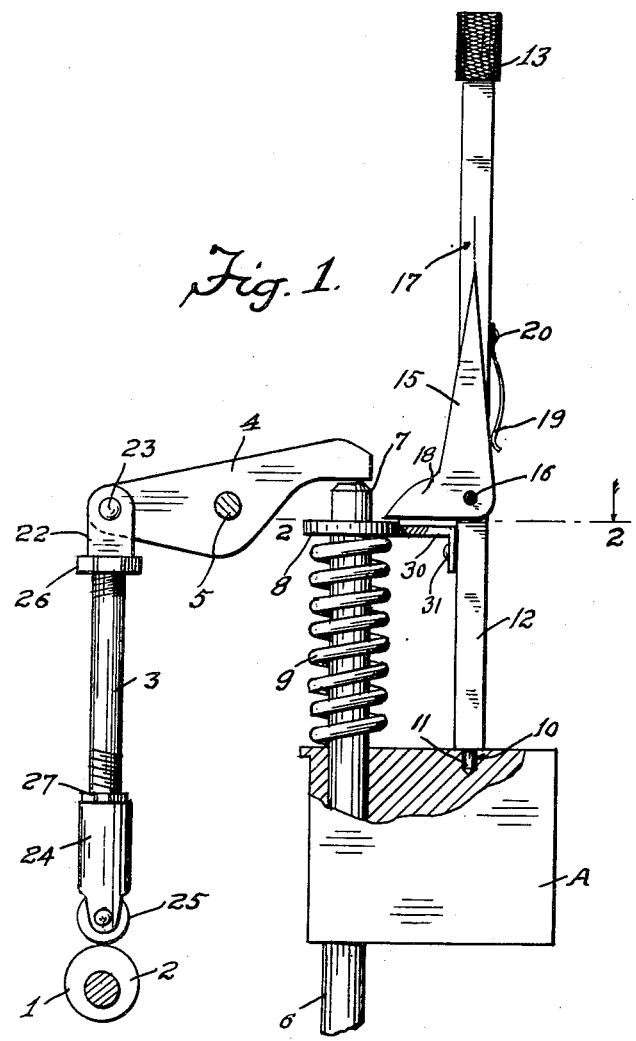
Figure 2:
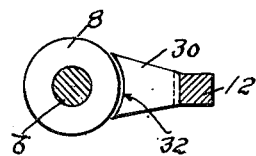

With these objects in view, the invention resides in the combinations hereinafter fully described and illustrated in the accompanying drawing, of which:

Fig. 1 is a schematic view of certain parts of the valve control mechanism of an internal combustion engine to which the device of the invention is shown applied; and Fig. 2 is a cross-sectional view of parts of the device taken substantially on line 2—2 of Fig. 1 in the direction of the arrow.

The numeral 1 denotes the fuel valve control shaft of an internal combustion engine. Cams, such as indicated at 2, are rigidly secured to this shaft and each cam is by a rod 3 operatively connected to swing a rocker 4 on its pivot 5, thereby to depress a plunger 6 and through this plunger to open the valve. The plunger is seated for axial movement within a portion A of the engine casing and it is fitted with a head 7 the inner portion of which is enlarged to form a shoulder 8. A spring 9 engages the underside of this shoulder normally to maintain the plunger in the elevated valve opening position indicated in the drawing. The casing A is at 10 shown recessed to form a cylindrical socket of a size snugly to receive therein the stem of the type of gage generally employed to determine whether or not the plunger is correctly adjusted vertically to open the valve at the proper time. All of the foregoing constitute well-known parts of internal combustion engines now widely used. The type of gage ordinarily used includes a head which is rotatable on the stem to contact the upper surface of the shoulder and the head is graduated to show any error in the adjustment of the plunger. To correct any error of adjustment, it is required to adjust the angular position of the rocker 4, as is hereinafter more fully described, whereupon the head of the gage again may have to be rotated and the rod readjusted until the correct setting is obtained. This is a slow and cumbersome operation, particularly because the space surrounding the plunger is so crowded with other parts of the engine that the gage must be removed each time the head thereof has been rotated in order to enable the operator to check the scale reading thereof.

The device of the invention includes a stem 12 terminating at the lower end thereof in a tip 11 which fits snugly into the recess of the engine casing. The stem 12 rises above the plunger and at the top thereof is fitted with a knurled finger grip 13. A lever 15 is at 16 shown pivotally mounted on the stem to form therewith the gage of my invention. The upper end of this lever forms a pointer which is positioned for registration with a graduation 17 of the stem. The lower end of the lever is laterally extended to form a foot 18 which rests on the shoulder 8 of the plunger. A spring 19 is at 20 shown rigidly secured to the stem 12 in position to bear against the rear edge of the lever 15 and so yieldingly to maintain the foot of the lever in contact with the shoulder of the plunger.

The devices above described are so designed and proportioned that the plunger 6 is in position to open the valve when correctly adjusted vertically, in which position the pointer will swing into registration with the graduation 17 when the gage is by the hand gripping the finger grip 13 held firmly in the position illustrated in the drawing. In order to obtain this result, it becomes necessary to adjust the position of the rocker 4, and the rod 3 is for this purpose seated in a threaded socket of a bifurcated head 22 which at 23 is pivotally hung on the end of the rocker 4. The lower end of the rod is similarly seated in a foot 24 in which a roller 25 is hung in position to ride on the cam 3. Once the connecting rod has been adjusted correctly to position the rocker relative to the head of the plunger, it is merely required to lock the rod in this adjusted position, and check nuts 26, 27 are provided for this purpose.

For the purpose of maintaining the gage of the invention in correct relation to the plunger 6, I have provided a guide 30, which at 31 is shown rigidly mounted on the gage stem 12. The outer edge of this guide is shown recessed to conform to the contour of the shoulder 8 of the plunger. When the gage is held firmly in position with the guide 30 lightly pressed against the peripheral surface of the shoulder, it is found that correct adjustment of the plunger is obtained at the time the pointer reaches position of registration with the graduation 17 of the gage.

It is seen from the foregoing description that I have provided a very simple and efficient gage which rises above the engine parts surrounding the plunger 6 and may remain in position while the length of the connecting rod 3 is adjusted. The operator can continue this adjusting operation, while watching the gage, until the pointer registers with the graduation 17. The rod is then locked in correctly adjusted position.

I claim:

A gage for timing the fuel injection valves of an internal combustion engine having cam operated connections controlling the operation of said valves and a plunger in each connection having a cylindrical shoulder thereon, the engine casing having recesses therein, said valve timing gage including: a stem manually seatable in one of the recesses of the engine casing adjacent to and parallel with any one of said plungers, said stem having a graduation thereon, a guide on the stem having a circular recess therein of a size fittingly to engage the edge of the shoulder of the plunger correctly to maintain the stem manually held in position relative to the plunger, a lever pivotally mounted on the stem, one end of said lever being laterally extended to rest on the shoulder of the plunger, the other end of the lever forming a pointer for registration with said graduation, and a spring urging the lever into engagement with the shoulder.

UNUS P. COLE.

References Cited in the file of this patent

UNITED STATES PATENTS

| Number | Name | Date |
|---|---|---|
| 1,485,429 | Powell | Mar. 4, 1924 |
| 1,495,887 | Crane | May 27, 1924 |
| 1,558,294 | Sandbo | Oct. 20, 1925 |
| 1,592,118 | McBain | July 13, 1926 |
| 1,654,319 | Brown | Dec. 27, 1927 |
| 2,278,710 | Orr | Apr. 7, 1942 |
| 2,471,746 | Hilbert | May 31, 1949 |
| 2,474,294 | Weeks | June 28, 1949 |

FOREIGN PATENTS

| Number | Country | Date |
|---|---|---|
| 711,244 | France | June 23, 1931 |